US007865616B2

(12) United States Patent
Saffre et al.

(10) Patent No.: US 7,865,616 B2
(45) Date of Patent: Jan. 4, 2011

(54) VIRTUAL NETWORKS

(75) Inventors: Fabrice T P Saffre, Suffolk (GB); Mark A Shackleton, Suffolk (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 140 days.

(21) Appl. No.: 12/084,383

(22) PCT Filed: Oct. 16, 2006

(86) PCT No.: PCT/GB2006/003842

§ 371 (c)(1),
(2), (4) Date: Apr. 30, 2008

(87) PCT Pub. No.: WO2007/057633

PCT Pub. Date: May 24, 2007

(65) Prior Publication Data

US 2009/0157902 A1    Jun. 18, 2009

(30) Foreign Application Priority Data

Nov. 18, 2005    (EP)    .................................. 05257118

(51) Int. Cl.
*G06F 15/16*    (2006.01)
*G06F 15/173*    (2006.01)

(52) U.S. Cl. ...................... 709/242; 709/217; 709/224; 709/226; 709/243

(58) Field of Classification Search .................. 709/242, 709/217, 224, 226, 243
See application file for complete search history.

(56) References Cited

U.S. PATENT DOCUMENTS 6,604,140 B1    8/2003    Beck et al.
7,200,657 B2 *   4/2007   Adams et al. ................ 709/224

(Continued)

FOREIGN PATENT DOCUMENTS

WO    WO 99/56488    11/1999
WO    WO 2006/035191    4/2006

OTHER PUBLICATIONS

F. Saffre and H. R. Blok, "*SelfService*": A theoretical protocol for autonomic distribution of services in P2P communities, 12th IEEE International Conference and Workshops on the Engineering of Computer-Based Systems, ECBS '05, Apr. 4-7, 2005, pp. 528-534.

(Continued)

*Primary Examiner*—Wing F Chan
*Assistant Examiner*—David X Yi
(74) *Attorney, Agent, or Firm*—Nixon & Vanderhye P.C.

(57) ABSTRACT

A virtual network has a plurality of nodes. Each node has the capability to provide a service to another node. Each node maintains a list for storing entries each representing a link to another node; each entry contains the address of the other node and a label identifying a service that that other node may provide. Each node also has a store for storing messages received from other nodes, these messages serving to propose a link and containing the identity of the node originating the message, a label identifying a service that that other node may provide and a label identifying a service that that other node requires. When a node needs a service that it is not itself able to provide, it searches the link list for a link having a label that matches the service needed, and in the event that such a link is found it transmits to the node identified by the link a message requesting the service. If, however, no such link is found, it searches the message store for a message identifying another node where the label identifying a service that that other node may provide matches the service needed and the label identifying a service that that other node requires matches the service that the node needing the service has the capability to provide. In the event that such a message is found it initiates the creation of a corresponding entry in the link list. If no such message is found, the node needing the service generates a message serving to propose a link and containing its own identity, a label identifying a service that it has the capability to provide and a label identifying the service that it needs.

14 Claims, 5 Drawing Sheets

U.S. PATENT DOCUMENTS

| | | | | |
|---|---|---|---|---|
| 7,222,187 | B2* | 5/2007 | Yeager et al. | 709/237 |
| 7,251,689 | B2* | 7/2007 | Wesley | 709/224 |
| 7,325,034 | B2* | 1/2008 | Douglis et al. | 709/205 |
| 7,533,168 | B1* | 5/2009 | Pabla et al. | 709/224 |
| 7,584,226 | B2* | 9/2009 | Fatula et al. | 1/1 |
| 2003/0187974 | A1 | 10/2003 | Burbeck et al. | |
| 2004/0044727 | A1* | 3/2004 | Abdelaziz et al. | 709/203 |
| 2004/0103195 | A1* | 5/2004 | Chalasani et al. | 709/226 |

PUBLICATIONS

Jelasity, M. and Babaoglu, O., T-Man: "Gossip-based Overlay Topology Management," Proceedings of the 3rd International Workshop on Engineering Self-Organising Applications (ESOA '05) Utrecht, Jul. 2005.

Jelasity M (Bologna Univ., Italy), Guerraoui R., Kermarrec A-M, van Steen M, "The Peer Sampling Service: Experimental Evaluation of Unstructured Gossip-Based Implementations," Middleware 2004. ACM/IFIP/USENIX International Middleware Conference. Proceedings, Oct. 18-22, 2004, Springer-Verlag pp. 79-98.

Eugster PT, Gueeraoui R, Handurukande SB, Kouznetsov P (Distributed Programming Lab., "Lightweight Probabilistic Broadcast," ACM Transactions on Computer Systems, vol. 21, No. 4, Nov. 2003, pp. 341-374.

Jelasity M., Montresor A., Babaoglu O., "Gossip-Based Aggregation in Large Dynamic Networks," ACM Transactions on Computer Systems, vol. 23, No. 3, Aug. 2005, pp. 219-252.

"New to Autonomic Computing," IBM: http://www-128.ibm.com/developerworks/autonomic/netwo/.

Babaoglu, O., Jelasity M., Montresor, A., "Grassroots Approach to Self-Management in Large-Scale Distributed Systems," Post-Proceedings of the EU-NSF Strategic Research Workshop on Unconventional Programming Paradigms, Mont Saint-Michel, France, Sep. 15-17, 2004, http://www.cs.unibo.it/babaoglu/papers/upp2004.pdf.

Saffre, F., Halloy, J., Shackleton, M., and Deneubourg, J.L., "The Ecology of the Grid," Proceedings of the $2^{nd}$ IEEE International Conference on Autonomic Computing (ICAC'05): 378-379.

Jelasity, M., Babaoglu, O., "T-Man: Fast Gossip-based Constructions of Large-Scale Overlay Topologies," Technical Report UBLCS-2004-7, University of Bologna (May 2004).

International Search Report for PCT/GB2006/003842 mailed Dec. 20, 2006.

* cited by examiner

VIRTUAL NETWORKS

This application is the U.S. national phase of International Application No. PCT/GB2006/003842, filed 16 Oct. 2006, which designated the U.S. and claims priority to European Patent Application No. 05257118.9, filed 18 Nov. 2005, the entire contents of each of which are hereby incorporated by reference.

Technical Field

This invention relates to virtual networks, and inter alia to the decentralised management of resources through self-organization in large ensembles of autonomic entities (hardware and/or software). Such management approaches are required in order to realise "Autonomic" Systems; note that "Autonomic computing is a phrase used to describe the set of concepts, technologies, and tools that enable applications, systems, and entire networks to become more self-managing. Self-management involves four qualities which are often referred to as Self-CHOP characteristics—self-configure, self-heal, self-optimize, and self-protect." (Ref: http://www-128.ibm.com/developerworks/autonomic/newto/)

Background and Summary

The general idea of using emergent properties and self-organization to manage resources when central control is impractical is not a new one. Many authors (see, e.g., O. Babaoglu, M. Jelasity, A. Montresor, "Grassroots Approach to Self-Management in Large-Scale Distributed Systems", *Post-Proceedings of the EU-NSF Strategic Research Workshop on Unconventional Programming Paradigms*, Mont Saint-Michel, France, 15-17 Sep. 2004. http://www.cs.unibo.it/babaoglu/papers/upp2004.pdf) have proposed partial and/or abstract solutions to a variety of problems in that space, (see also our international patent application PCT/GB2005/003068).

F. Saffre and H. R. Blok, "'SelfService': a theoretical protocol for autonomic distribution of services in P2P communities", *12th IEEE International Conference and Workshops on the Engineering of Computer-Based Systems*, ECBS '05, 4-7 Apr. 2005, page(s): 528-534, describe a peer-to-peer protocol where a peer requiring a service for the first time broadcasts a request for it: when it receives a response it keeps a note of the respondent's address, for use when the service is required again. Another relevant background reference Is a system called T-Man (M. Jelasity and O. Babaoglu. T-Man: "Gossip-based overlay topology management", *Proceedings of the 3rd International Workshop on Engineering Self-Organising Applications* (ESOA'05), Utrecht, July 2005. http://www.cs.unibo.it/babaoglu/papers/esoa05.pdf), which is a kind of gossip-based sorting algorithm. Basically, T-Man causes an initially random network to self-organise into an ordered structure in which every node is connected to its "closest relatives" in an abstract space of arbitrary dimension.

According to the present invention there is provided a method of operating a virtual network comprising a plurality of nodes, wherein (a) each node has the capability to provide a service to another node;
(b) each node maintains a link list for storing entries each representing a link to another node, and containing the address of the other node and a label identifying a service that that other node may provide;
(c) each node has a message store for storing messages received from other nodes, said messages serving to propose a link and containing the identity of the node originating the message, a label identifying a service that that other node may provide and a label Identifying a service that that other node requires;
(d) each node in response to a need for a service that it is not itself able to provide
   (i) searches the link list for a link having a label that matches the service needed and in the event that such a link is found transmits a message to the node identified by the link, requesting the service;
   (ii) in the event that no such link is found, searches the message store for a message identifying another node where the label identifying a service that that other node may provide matches the service needed and the label identifying a service that that other node requires matches the service that the node needing the service has the capability to provide; and in the event that such a message is found initiates the creation of a corresponding entry in the link list;
   (iii) in the event that no such message is found, generates a message serving to propose a link and containing its own identity, a label identifying a service that it has the capability to provide and a label identifying the service that it needs.

Other, preferred, aspects of the invention are defined in the sub-claims.

BRIEF DESCRIPTION OF THE DRAWINGS

One embodiment of the invention will now be described, with reference to the accompanying drawings, in which.

DETAILED DESCRIPTION

Figure 1:
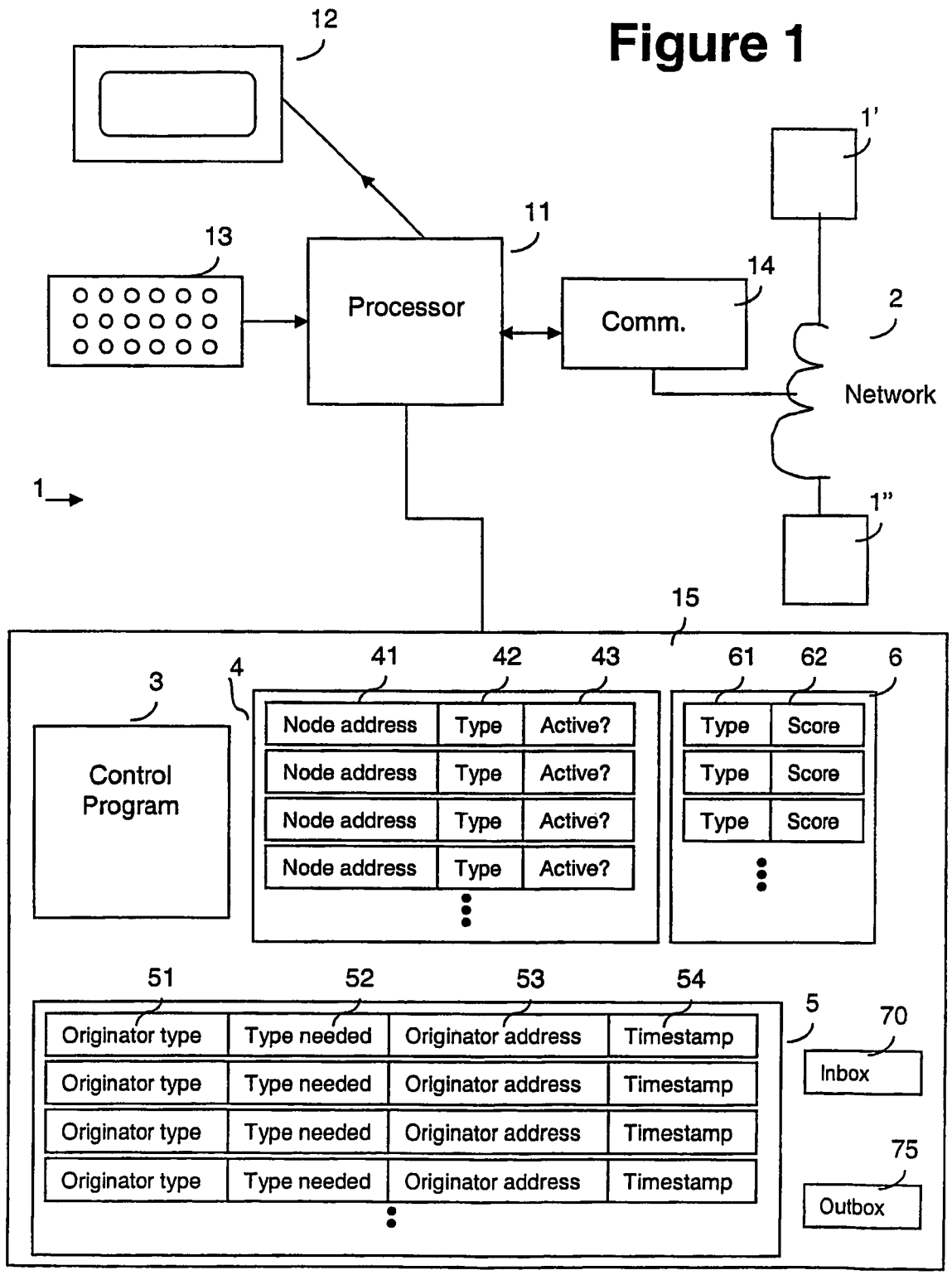
FIG. 1 is a block diagram of part of a telecommunications system operating in accordance with one embodiment of the invention.

FIG. 1 shows a computer 1, connected to a telecommunications network 2, by means of which it is able to send messages, and receive messages from, other such computers of which two 1', 1" are shown in outline. Each computer may also constitute a node of a virtual, or overlay network. Unlike the network 2, the overlay network has no independent physical existence: rather, its existence is defined by stored data which define links between nodes and hence also define an overlay network to which those nodes that have at least one such link defined, belong. All messages between nodes are carried by the physical network 2.

Although in this example each node is associated with a separate computer, it is possible to have several nodes on one computer, each represented by a separate program or process running on that computer; indeed, all the nodes could be processes running on one single computer. In such cases, of course, the function of the network 2 would be partly or wholly performed by the computer's own buses or other internal communication routes.

The overlay network is essentially a peer-to-peer network and its function is in order that nodes may perform services for other nodes. The actual services involved are immaterial to the operation of the invention, as, in principle, any kind of service may be supplied. By way of illustration, some typical services might be unit conversion, specialised processing of data or even access to specific resources (storage, sensors . . . ) in which case not all nodes would be capable of instantiating all services, but only a sub-set of these. The idea is that a node maintains a list of links (which, together with the lists maintained by other nodes, defines the overlay network): when it requires a service that it cannot itself provide, it looks at the list to identify a node that can.

In this example, all nodes have the same structure. In FIG. 1, the computer 1 has a processor 11, human input and output interfaces in the form of a display 12 and keyboard 13, a communications interface 14 to the network 2, and memory 15.

The memory 15 contains operating system and other programs according to the function that the computer is to perform, and an overlay management program 3. Data areas for the overlay management program include a link list 4 which contains the aforementioned links, an advert table 5, a score table 6, an inbox 70 and an outbox 75, to be described in more detail presently.

For the purposes of description, it will be assumed that the list 4 already contains a number of entries. Each entry consists of the network address 41 of another node, a label 42 indicating the service that the node at that address can provide, and a flag 43 indicating that the link is active (or inactive). We refer to any node whose address appears in the link list as a "neighbour" of the node whose list it is.

The system relies on gossiping along co-operative links in the overlay network to propagate information about system state. Basically, every time that a node fails to identify a suitable provider, it prepares an advert specifying its own identification, which service is needed and which one it can provide in return (i.e. its present type). Adverts are periodically sent between neighbours, and propagated for a fixed amount of time (as in many peer-to-peer systems; this "time-to-live" mechanism is used to stop traffic from increasing indefinitely, by ensuring that outdated requests are discarded). Before forwarding adverts, every node keeps a local copy, building itself a partial but expanding and regularly updated picture of the offer and demand throughout the system (the adverts stack).

Every node keeps, in its advert table 5, a local list of so-called "adverts" that have reached it, indexed first by the function that they offer, second by their "age" (newest on top). The generation of these adverts will be described later. An advert contains four distinct pieces of information:
  The type 51 of the sender at the time when the advert was generated (i.e. the service/function on offer)
  The type/function 52 requested in exchange (i.e. the service needed by the sender at the time when the advert was generated)
  The unique identity 53 of the sender (e.g. the network address or computer name)
  A timestamp 54

The score table 6 contains an entry for each service, with the service type 61 and a field 62 for a score x.

Note that adverts can be forwarded from node to node, and that therefore the originating node may not be a neighbour of the node whose advert table it is.

The functions to which a node needs access are assumed to be completely identified locally (i.e. every participant "knows" its own needs) but can vary over time.

Figure 2:
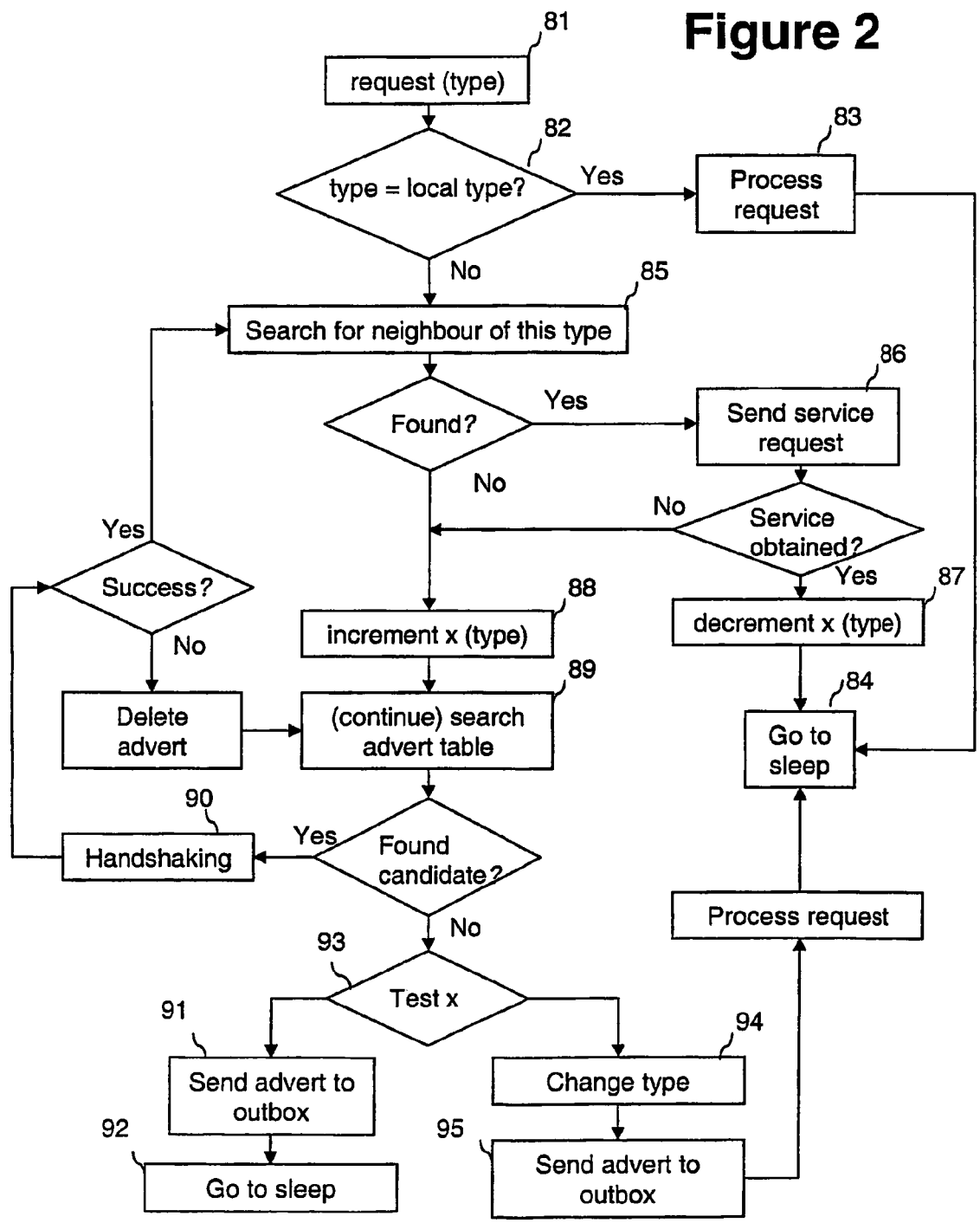
FIG. 2 is a flowchart illustrating the operation of the system.

FIG. 2 is a flowchart showing the operation of the overlay management program 3 whenever a function is required to be performed. At 81, a request for service is received, typically from some other program running on the processor 11. The request specifies the label of the service that is required. We refer to this here as the service "type". As, in this example, one node is permitted to offer only one type of service, we will also make reference to the "type" of node. At 82, it is determined whether the node can itself provide the required service: if so, the request is serviced at 83 and the process becomes dormant at 84.

If not, then in Step 85 a search is made in the link list 4 to determine whether it contains a link specifying the desired type in the label field 42—that is, it already knows (i.e. is connected through the overlay to) a provider, i.e. another node belonging to the right "type". If so, then at 86 it sends a service request to the identified neighbour. Assuming that the requested service is received, the score x (in field 62) for that service is (if nonzero) decremented at 87.

If it knows no provider (or if the provider fails to answer the request for whatever reason), it increments the score x at 88 and then looks 89 through its locally kept list of adverts in the advert table 5 (examining those with the most recent timestamps 54 first) to identify a suitable candidate, that is to say the advert whose offer type 51 matches the type required and whose needed type 52 matches the service that the local node can provide. If such an entry is found, the program enters at 90 into a handshaking procedure which, if successful, will create a new entry in the link list 4, linking to the node that originated the advert, and also create a matching, but reciprocal entry in the link list of the node that originated the advert. The handshake procedure (described below) will only succeed if:
  Both nodes still have symmetrical needs (i.e. the node originating the advert hasn't changed type or found another provider since the advert was created).
  Both nodes have a spare (i.e. currently unallocated) or useless (i.e. connected to a peer that doesn't provide a necessary service) link.

If it does, the new co-operative link is created—meaning that each node makes a note of the other's addresses and associates It with the required service for future reference, and that both nodes start the process of forwarding any queuing requests for the corresponding service type (including that which triggered the creation of that link) to the newly identified provider.

If no suitable advert is found, the system's next option is to prepare a new "advert" of its own, seeking a partnership. Basically, the idea here is that when a node fails to identify a suitable provider, it prepares an advert specifying its own identification, which service is needed and which one it can provide in return (i.e. its present type): the format is as specified earlier. Thus at step 91 the new advert is placed in the outbox 75 for sending to the node's neighbours. See below for transmission mechanisms.

When it has sent the advert, it then remains dormant (92) until one of the advert recipients starts a handshaking process. A node will stay dormant until targeted by a handshake, receiving a new request, or awakened by a self-directed "wake-up" call (delay determined by random test). In the latter case, a node will reexamine queuing requests, which will re-initiate the procedure for searching a provider (a suitable new advert may have been received since the last failed attempt).

If the node consistently fails to identify a provider for a particular service, it may choose to take the radical action of discontinuing the service that it is currently hosting and replace it with the one for which it has not been able to find a "collaborator". This obviously creates a crisis for the node and for its neighbours, as it instantly makes all its existing symbiotic links obsolete (since the node that has Just changed type will no longer be capable of providing the service for which they were established, making the relationship useless for its partners). The underlying assumption is that this crisis can and will be resolved by a cascade of other modifications (of the overlay's topology and/or of individual nodes' speciality), and that the change of type will contribute to increased availability of the service in question.

Thus, before composing a new advert at step 91, the system at step 93 examines the value of the score x for the service in question. In principle the decision could be that a new advert is placed in the outbox unless x exceeds a certain threshold value. However, we prefer a probabilistic decision—that is, we make a biased random decision such that the probability of moving to Step 94 to change type is P and the probability of moving to sending an advert at step 90 is 1-P, and the probability P is a monotonically increasing function of x.

One example of such a function that may be used is $$P = 1 - \frac{1}{1 + (x/x_c)^\alpha} \quad (1)$$

where x is decremented/incremented by one at each successful/unsuccessful attempt, and re-initialised to zero if the node turns itself into the corresponding type, and $x_c$ and $\alpha$ are parameters for which typical values might be $\alpha=2$ or 3, while $x_c$ should reflect the tolerance to failure and/or the expected difficulty of identifying a provider, which could be a function of the total number of services.

Other expressions like, e.g.:

$$P = 1 - \frac{1}{1 + e^{\alpha(x-x_c)}} \quad (2)$$

could have been used instead (preliminary results only suggest that it should be a sigmoid, which confirms intuition for those familiar with similarly self-organising systems found in nature). Here, provided that $\alpha>1$, the value of the parameters will primarily affect quantitative, not qualitative behaviour. They will typically need to be selected on a case by case basis, and may even benefit from being modified while the system is in operation to accommodate changes in conditions.

We have also experimented with variants in which the probability that a node changes type also decreases with the number of such "metamorphoses" that it has undergone already. For that purpose, we used the following transformation from P into P*:

$$P^* = Pe^{-\beta y/N} \quad (3)$$

where y is the number of previous type changes, N is the total number of types and $\beta$ is a (positive) parameter. Another possible variant is to make $x_c$ a function of N, rather than constant.

The node that has changed type then sends an advert at Step 95 requesting the service that it has just discontinued (and so will now need from another node) and offering that which it has just instantiated in its place. It does not modify its linked list (that would not be in its own interests, since these links identify providers of other needed services).

If desired, it could be arranged that a node should notify its neighbours when it changes type, thus giving them the opportunity to remove links that point to it. In this example however we do not provide this. The neighbours will (as described below) eventually remove the links as the node that has changed type persistently fails to respond to requests for service of the "old" type. Once the node has changed type, it services the request at Step 96.

Turning now to the operation of the inbox 70, this is a buffer area for storing incoming adverts. At irregular intervals (probabilistic decision), a node opens its "inbox", where new incoming messages are stored between inspections. When opening an advert message, the recipient immediately checks whether the local list 5 already contains an advert from the same provenance. If it does and the new advert's timestamp designates it as more recent (which isn't necessarily the case, as a newer advert could have arrived first if following a different gossiping route), it replaces the older one. As a result, there can never be more than one entry per node in the local list of adverts. If on the other hand there is no existing advert from the same originator, the new advert is added to the advert table 5.

In order to speed up the search, in a modification we provide two separate indexes to the advert table. In one of them, adverts are sorted by offer type first, by age second, so that the node knows where to look when (in Step 89) it needs something (i.e. it doesn't have to go through all the adverts every time that it needs to find a new provider) and finds the most recent advert (i.e. the most likely to be still valid) for any given service first. In the other index, they are sorted by origin (ID of the poster of the advert) so that the node can easily verify whether it already knows the origin of a newly received advert and if so, whether it should be replaced with the new information (which may require changing the position of the advert in the first index if it relates to a type change).

Whenever a node receives an advert that modifies its own local list (i.e. new provenance or new offer/request from an already identified source), it also creates a copy in the outbox 75.

In this example, when an advert comes in whose originator is a neighbour (that is, there is a corresponding link in the link list) no change is made to the list of links (e.g. if the neighbour that originated the advert has changed type), rather the only way in which a neighbour type change is detected is through a failed request. In a modification, however, it would be possible (and, indeed, perhaps is both more efficient and relatively straightforward) to use the advert to update the link's status.

The content of the outbox (which may be locally generated messages from step 91 or messages to be forwarded) are dealt with, also at irregular intervals (probabilistic decision). Each advert in the outbox is sent to all neighbours. If desired, however, constraints can be imposed on the number of messages that can be sent to every neighbour in order to accommodate link capacity. Also, a time limit can be added so that possibly "outdated" adverts do not unnecessarily clog the network; thus an advert will be discarded if the difference between the current time and the timestamp borne by the advert exceeds some preset "time to live".

If desired, a node may also maintain an additional list of the addresses of a small number of randomly-chosen nodes, to which messages from the outbox are also sent. This helps to bootstrap the system at startup and also discourages the formation of isolated clusters of nodes.

Handshaking

We now turn to description of the handshaking process of Step 89 above. Suppose at a particular node A (which has the capability to deliver service s1) a service of type s4 has been requested, and node A has (at Step 88) searched its advert table and found an advert originally posted by node D, offering service s4 and requesting service s1. The advert reads (in the format shown in FIG. 1) [s4; s1; D, timestamp].

81 Node A sends to node D a service request (typically containing A's address and a copy of the advert;

82 Upon receipt, node D checks that it still provides the specified service s4;

83 Node D also checks that it still requires service s1;
84 If both tests are satisfied, node D sends an acceptance message to node A; otherwise it sends a rejection message;
85 If node A receives a rejection message (or no reply at all within a specified timeout period) it aborts the handshake and moves to step 91. It also interprets handshake failure as an indication that the advert is out of date and triggers its deletion. This avoids repeatedly trying to initiate a link with a node after it has been discovered (through the failure of the handshake) that it is no longer suitable to provide the advertised service;
86 Upon receipt of an acceptance message it creates in its link list an active link to node D for service s4, and sends a confirmation message to D;
87 D receives the confirmation message and creates in its link list an active link to node A for service s1.

Of course, if desired, the two nodes may exchange additional information, and perform further checks, before reaching agreement on the setting up of these links.

Note that, in this example, the advert that gave rise to the handshaking process is allowed to remain in the advert table, in case it should be useful in the future (e.g. if the node repeatedly changes type).

Link Removal

A process is needed for the removal of links that are out-of-date. This is the reason for the "active?" flag 52. When a link is created, it is marked "active". If the link is judged to be of no further use, it is marked "inactive". In principle It would be possible simply to mark a link inactive in the event that the node to which it points fails to respond to a request for service. However, this is not ideal, as the failure might be due to a temporary problem; so we prefer to take this decision based on the value of the score x for the service that the node is offering, for example that a link is marked "inactive" when the score x exceeds some threshold value $x_T$. Or it could be a probabilistic decision as in the case of the send advert/change type decision.

In the above-described example, every node is assumed to perform only one function at a time, i.e. it cannot simultaneously host/provide more than one set of services (assimilated to belonging to a specific "node type"). As a result, acquiring the ability to perform a new function requires changing type (which implies losing the ability to perform the previous one). However, this simplification was introduced for clarity only and is not a fundamental limitation of the proposed algorithm (qualitatively similar collective decision dynamics could be obtained even of every node was capable of performing several functions, i.e. belonging simultaneously to multiple types). If it is desired to provide two services at one location, this could be accommodated by having two nodes at that location, but alternatively the system could allow a node to offer more than one service. Naturally, the link and advert formats would need to be modified so that a link or advert could indicate which service (or services) of a number of possible services available at a particular node it actually pertained to.

Variations

In another variant, the concept of "volunteering" is introduced. Suppose a node A, that provides service s1, has spare capacity. It may spontaneously review the adverts that it 315 has in its advert table and in the event that it finds an advert from a node that needs service s1, may initiate a handshake with that node (say, node B offering service s2) even though it (A) already has an active link to a supplier C for service s2. This would proceed as previously described except that it would not be necessary to verify that B still offers service s2, and, since a link from A to B is unnecessary, that link could either be flagged 320 as inactive, or, alternatively, not created at all. This would result in the link tables containing the following entries:

A's link table contains: Active link to C (which supplies s2); Inactive link to B (which supplies s2)
B's link table contains: Active link to A (which supplies s1)
C's link table contains: Active link to A (which supplies s1).

Figure 7:
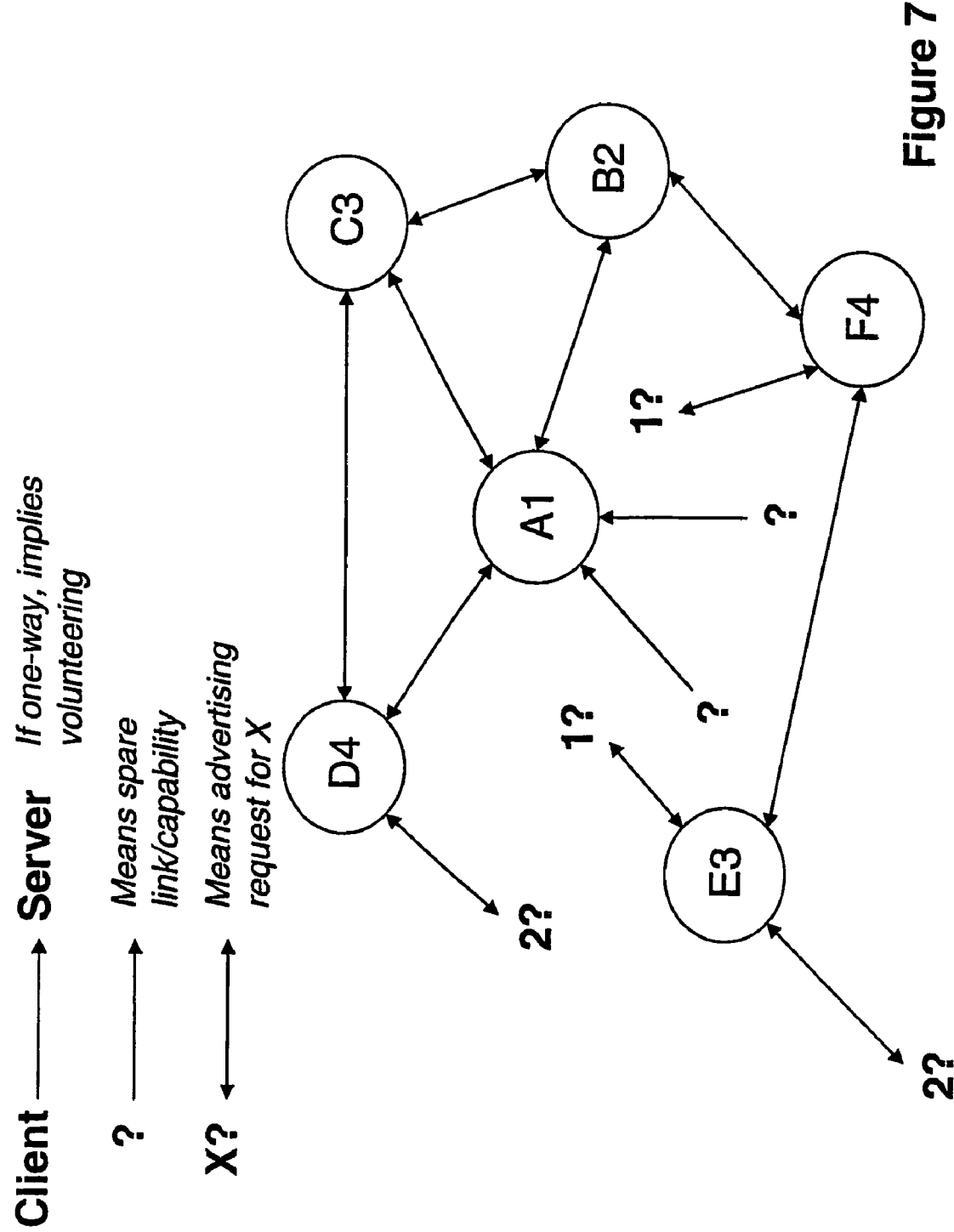
Figure 8:
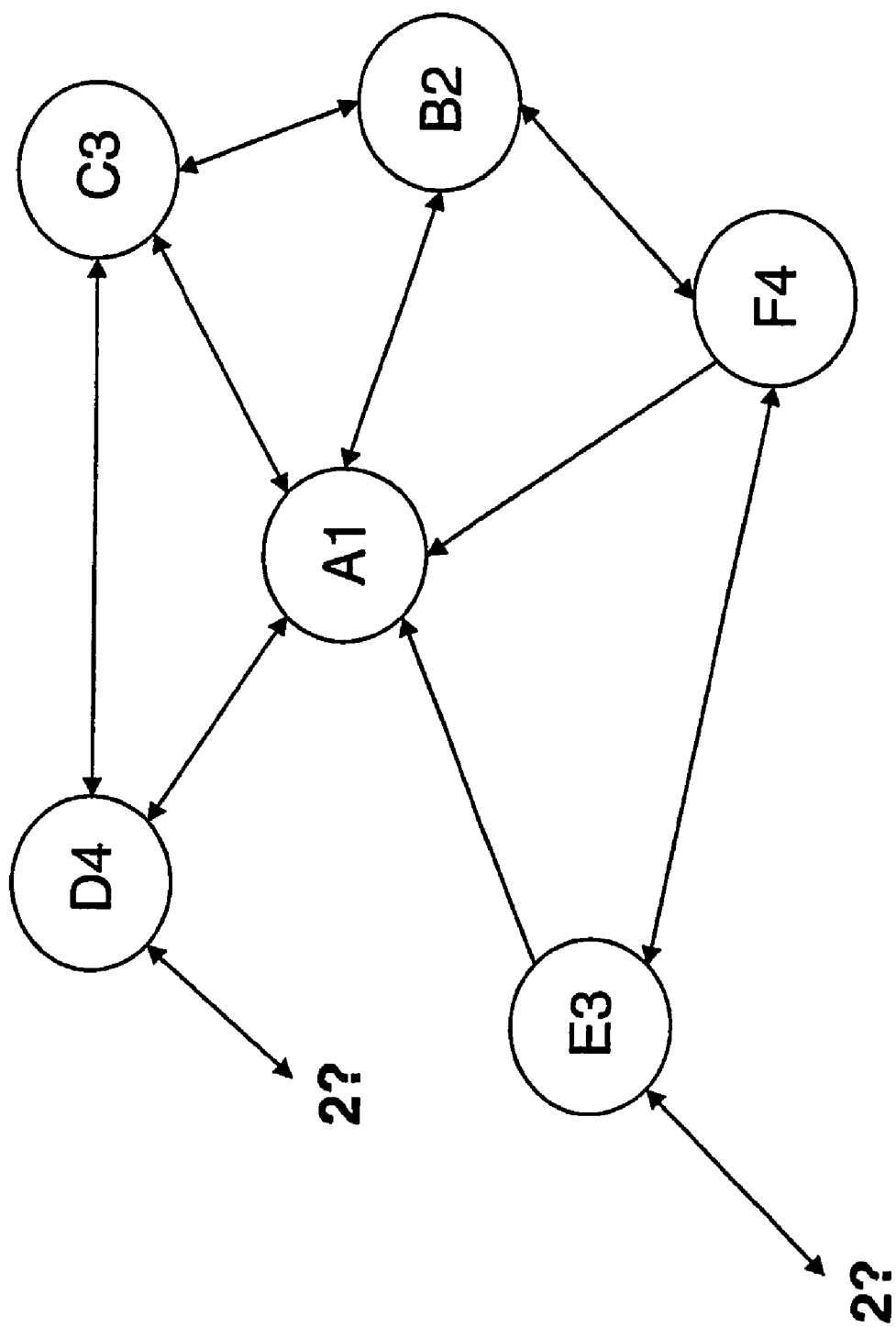

This process is illustrated in FIGS. 7 and 8. In FIG. 7, we see that node A1 has spare capacity to supply service 1, whilst E3 and F4 are advertising a need for this service: in FIG. 8, these needs are satisfied by the unidirectional links represented by the one-way arrows.

Note that the spare or inactive link could be used to provide some resilience, in case that the active link to the corresponding service fails subsequently.

Another option that can be invoked is the concept of three-way links. This is indeed potentially very powerful and does not require much modification as the advertising infrastructure already has all the necessary features. Imagine that node A offering service s1, denoted A(s1), needs service s2. It knows of B(s2) but B doesn't need service s1, it needs service s3. It is very possible that A(s1) knows of C(s3) in need of service s1 (which A could provide) but with which it hasn't initiated a link because A itself doesn't need service 3. In this scenario, A has all the information to infer that a triangular collaborative relationship would benefit A, B and C and can agree to provide service s1 to C in exchange for C providing service s3 to B if B agrees to provide service s2 to A. In this case, three asymmetrical links form a closed loop and all three nodes' needs are taken care of. This reasoning can of course be extended to larger groups.

The process involved at node A would be as follows (inserted into the flowchart of FIG. 2 immediately after the failure to set up a normal (2-way) link and immediately before the test at 93): Assume that node A offers service s1 and it requires service s2.

101 It searches its advert table for any pair of adverts for which
the first advert is of "Originator type" s2 (matching the type needed by node A)
the second advert is of "Type needed" s1 (matching the type offered by node A)
the "type needed" of the first advert matches the "Originator type" of the second advert (and is not the same type as those needed or offered by node A).
102 It sends a service request to the node that posted the first advert of the pair (as in step 84 above);
103 It sends a service request to the node that posted the second advert of the pair (as in step 84 above);
104 If it receives an acceptance message from both nodes it continues; otherwise it exits (to Step 91);
105 It adds to its link table a link to the node that posted the first advert, specifying service s2;
106 It sends a message to the node that posted the first advert instructing it to set up a link to the second node, specifying the service recorded in the "type needed" of the first advert (and, of course, in the "Originator type" of the second advert);
107 It sends a message to the node that posted the second advert instructing it to set up a link to the node A, specifying service type s1 (matching the type offered by node A).

If desired, this principle could be extended to the creation of "loops" having four, or more generally n, participants, in which case node A would need to search its table for n−1 adverts from nodes which with node A itself represent a closed chain of matching types offered and types needed.

In the above examples, it has been assumed that the link list contains only one active link to a node of any particular type. However, this is not a necessary limitation.

Discussion

Like T-Man, the system discussed above uses exclusively gossiping to propagate information throughout the network and individual nodes can choose to swap neighbours based on whatever they learn about their counterparts through this process. Unlike in T-Man, they do not select neighbours based on a static identifier, but by trying to establish a set of symbiotic relationships with partners whose "specialty" complements their own at the time when the link is created. Because individual nodes can subsequently choose to stop hosting a given service and start hosting another (i.e. change type), these relationships can become unsuitable which will eventually initiate a rewiring process.

Figure 3:
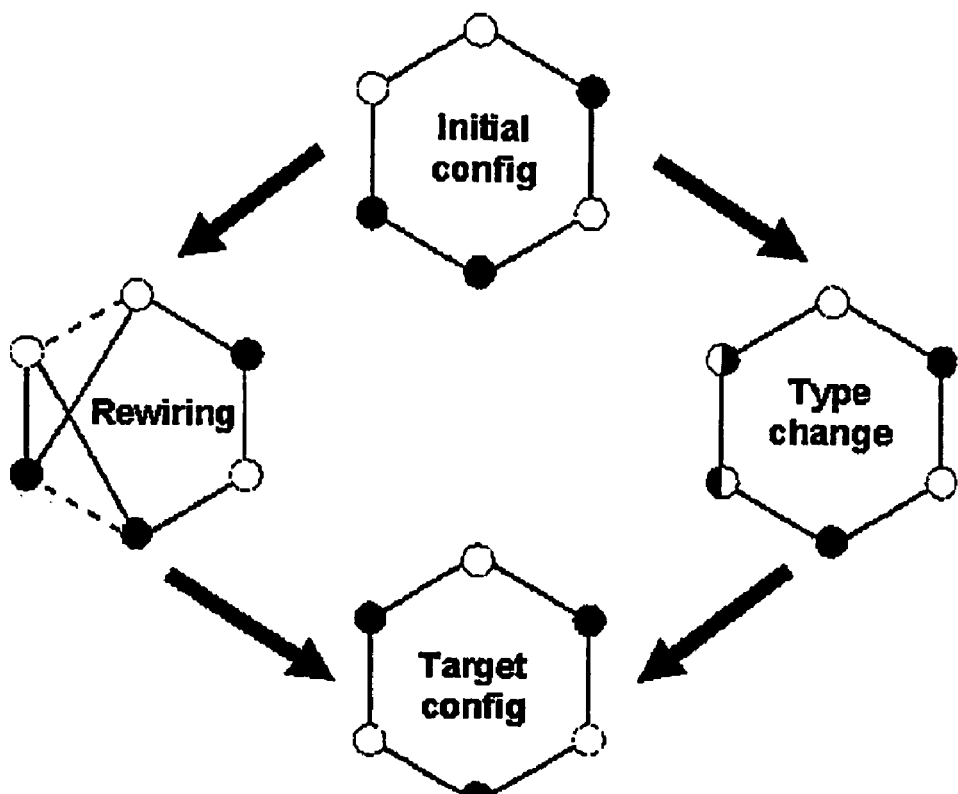
FIGS. 3 to 8 are diagrams illustrating various configurations of links between nodes.

A significant difference between the system and T-Man is therefore that in the former, the self-organisation process involves both rewiring and modification of local properties. In other words: a node can migrate towards a location in the network where its current type is needed, change type in an attempt to turn itself into a kind of unit more appropriate to its current location, or even combine both procedures. FIG. 3 illustrates, in a particularly trivial case, how the two processes can produce the same result. Each dot represents a node; those coloured white provide one type of service whilst those coloured black provide another. Links are represented by lines joining the dots. Where each half of a node is shown in a different colour, this means that it is in the process of changing state.

Figure 4:
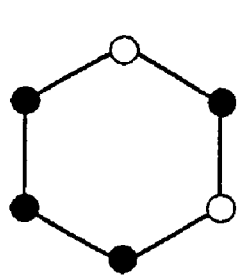
Figure 5:
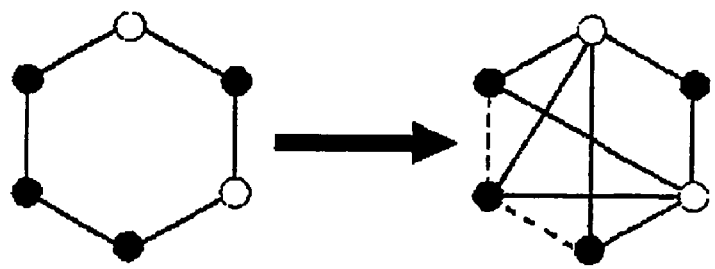

If the system were managed exclusively via T-Man "rewiring", it could only follow the left-hand path, while if it was relying on differentiation only, as in our own previous work [F. Saffre, J. Halloy, M. Shackleton and J. L. Deneubourg, "The Ecology of the Grid", Proceedings of the $2^{nd}$ IEEE International Conference on Autonomic Computing (ICAC'05): 378-379.], it could only follow the right-hand path. The advantage of being able to combine both methods is not clear in this example, because it's too simplistic. However, the reason why the T-Man approach works perfectly in this case is that there is already the right number of "black" and "white" nodes in the starting configuration. If it had been as shown in FIG. 4, rewiring alone would have been insufficient, unless the constraint on maximum node degree was lifted and the only relevant property of the target configuration was, e.g., that every black node should only have precisely two white neighbours, in which case it could be obtained by the process shown in FIG. 5.

Figure 6:
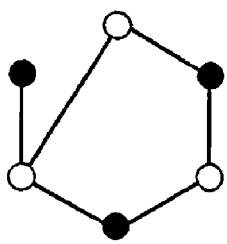

Symmetrically, there is no way that differentiation alone could have reached the target configuration starting from, e.g. the situation shown in FIG. 6, unless, again, we used only the simplified "every black node has precisely two white neighbours" criterion, in which case the target can be reached simply by changing the colour of the one offending black node to white.

Thus, with the system in the example described above, it is ensured that the exact target configuration can be reached from any of the above, and it is clear that the further the initial conditions are from the desired system state (topologically and/or in terms of node type distribution), the more potentially useful it is to be able to combine rewiring and differentiation.

More importantly, the simulations indicate that the system can easily cope with much more complex situations (dozens of mutually dependent "cell-types", hundreds of nodes, thousands of links), as shown in the results section.

The invention claimed is:

1. A method of operating a virtual network comprising a plurality of nodes, wherein
    (a) each node has the capability to provide a service to another node;
    (b) each node maintains a link list for storing entries each representing a link to another node, and containing the address of the other node and a label identifying a service that that other node may provide;
    (c) each node has a message store for storing messages received from other nodes, said messages serving to propose a link and containing the identity of the node originating the message, a label identifying a service that that other node may provide and a label identifying a service that that other node requires;
    (d) each node in response to a need for a service that it is not itself able to provide
        (i) searches the link list for a link having a label that matches the service needed and in the event that such a link is found transmits a message to the node identified by the link, requesting the service;
        (ii) in the event that no such link is found, searches the message store for a message identifying another node where the label identifying a service that the other node may provide matches the service needed and the label identifying a service that the other node requires matches the service that the node needing the service has the capability to provide;
    and in the event that such a message is found initiates the creation of a corresponding entry in the link list;
        (iii) in the event that no such message is found, generates a message serving to propose a link and containing its own identity, a label identifying a service that it has the capability to provide and a label identifying the service that it needs.

2. A method according to claim 1, in which the creation of a corresponding entry in the link list comprises:
    confirming with the node identified in the message that it is still able to provide the service and creating the entry only if this is so.

3. A method according to claim 2 in which, upon the creation of a corresponding entry in the link list, the node identified in the message also creates in its own link list an entry containing the address of the node that initiated the creation.

4. A method according to claim 1, including, in the event that no link nor message is found, the step of acquiring the capability to provide the needed service locally.

5. A method according to claim 4, including maintaining a measure (x) of the degree of success or failure of attempts to obtain a needed service, and, in the event that no link nor message is found, choosing between the step of generating a message identifying the service that it needs and the step of acquiring the capability to provide the needed service locally, in dependence of the value of the measure.

6. A method according to claim 5 in which the decision is taken in accordance with a probabilistic function (P) of the measure (x).

7. A method according to claim 1, in which each node is responsive to receipt of a said message serving to propose a link:
    in the event that it originates from the same node as does an existing message in the message store, and supersedes that message, to replace that existing message; in the event that is does not originate from the same node as does an existing message in the message store, to add it to the message store.

8. A method according to claim 7 in which a node, when replacing an existing message with a new message or adding a new message to the message store, also relays a copy to other nodes links to which are in its list of links.

9. A method according to claim 1, including maintaining an index of the contents of the message store, which is used in the step of searching the message store.

10. A method according claim 7, including maintaining a first index of the contents of the message store, indexing the messages by service offered, which is used in the step of searching the message store, and maintaining a second index of the contents of the message store, indexing the messages by the identity of the originating node, which is used for determining the action to be taken in respect of an incoming message.

11. A method according to claim 1, in which locally generated messages serving to propose links are stored locally and forwarded at irregular intervals based on a probabilistic decision.

12. A method according to claim 8, in which said copies of messages serving to propose links are stored locally and forwarded at irregular intervals based on a probabilistic decision.

13. A method according to claim 1, in which a node also spontaneously searches the message store for a message identifying another node where the label identifying a service that that other node requires matches the service that the node searching the message store has the capability to provide; and in the event that such a message is found initiates the sending, to the node identified in the message, of an invitation for that node to create, in its own link list, an entry containing the address of the node sending the invitation.

14. A method according to claim 1, in which, in the event of failure by a node to find, in its message store, a message identifying another node where the label identifying a service that that other node may provide matches the service needed and the label identifying a service that that other node requires matches the service that the node needing the service has the capability to provide; the node performs a further search in the message store for a pair of messages satisfying the following conditions:

a first message of the pair contains, as the label identifying the service that the node originating the first message may provide, a label that matches the service needed;

the second message of the pair contains, as the label identifying the service that the node originating the second message requires, a label that matches the service that the node performing the search has the capability to provide; and the first message of the pair contains, as the label identifying the service that the node originating the first message requires, a label that matches the label contained in the second message of the pair as identifying the service that the node originating the second message has the capability to provide;

and in the event that it finds such a pair, to initiate the creation of corresponding links.

* * * * *